United States Patent
Kim et al.

(10) Patent No.: US 10,557,530 B2
(45) Date of Patent: Feb. 11, 2020

(54) BELT TENSIONER

(71) Applicants: HYUNDAI MOTOR COMPANY, Seoul (KR); KIA MOTORS CORPORATION, Seoul (KR)

(72) Inventors: Sang Yun Kim, Hwaseong-si (KR); Ji Sung Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 207 days.

(21) Appl. No.: 15/803,086

(22) Filed: Nov. 3, 2017

(65) Prior Publication Data

US 2018/0355954 A1    Dec. 13, 2018

(30) Foreign Application Priority Data

Jun. 7, 2017  (KR) .................. 10-2017-0070583

(51) Int. Cl.
*F16H 7/12*   (2006.01)
*F16H 7/08*   (2006.01)

(52) U.S. Cl.
CPC ....... *F16H 7/12* (2013.01); *F16H 2007/0842* (2013.01); *F16H 2007/0865* (2013.01)

(58) Field of Classification Search
CPC ..... F16H 2007/0842; F16H 2007/0865; F16H 7/1263; F16H 2007/0806; F16H 7/12; F02B 67/06
USPC ........................................................ 474/137
See application file for complete search history.

(56) References Cited

U.S. PATENT DOCUMENTS

| | | | | |
|---|---|---|---|---|
| 1,578,700 | A * | 3/1926 | Anderson | B61D 43/00 105/103 |
| 3,630,096 | A * | 12/1971 | Brewer | F16H 7/1263 474/132 |
| 3,926,063 | A * | 12/1975 | Mayfield | F16H 7/1254 474/132 |
| 4,416,647 | A * | 11/1983 | White, Jr. | F16H 7/1281 474/134 |
| 5,938,551 | A * | 8/1999 | Warner | F16H 7/1263 474/111 |
| 7,530,911 | B2 * | 5/2009 | Serkh | F16H 7/1218 474/133 |
| 7,896,765 | B2 * | 3/2011 | Kuo | F16H 7/1281 474/134 |
| 2002/0039943 | A1 * | 4/2002 | Serkh | F16H 7/1218 474/134 |
| 2004/0045519 | A1 * | 3/2004 | Buglione | F02N 15/08 123/179.25 |
| 2005/0181901 | A1 * | 8/2005 | Shin | F16H 7/1218 474/134 |
| 2014/0194236 | A1 * | 7/2014 | Orita | F16H 7/1281 474/112 |
| 2017/0122414 | A1 * | 5/2017 | Takenaka | F16H 7/12 |
| 2017/0204944 | A1 * | 7/2017 | Holzberger | F16H 7/02 |
| 2018/0363743 | A1 * | 12/2018 | Chang | F16H 7/1281 |
| 2019/0024763 | A1 * | 1/2019 | Lebender | F16H 7/1263 |

* cited by examiner

*Primary Examiner* — Michael R Mansen
*Assistant Examiner* — Mark K Buse
(74) *Attorney, Agent, or Firm* — Morgan, Lewis & Bockius LLP (57) ABSTRACT

A belt tensioner includes a body configured to move along two or more axes and at least two idler rollers individually rotatably installed in the body and spaced apart from each other.

15 Claims, 14 Drawing Sheets

FIG.14

BELT TENSIONER

CROSS-REFERENCE TO RELATED APPLICATION

This application is based on and claims the benefit of priority to Korean Patent Application No. 10-2017-0070583, filed on Jun. 7, 2017, with the Korean Intellectual Property Office, the disclosure of which is incorporated herein in its entirety by reference.

TECHNICAL FIELD

The present disclosure relates to a belt tensioner, and more particularly to a belt tensioner that has a simple and compact structure, thereby reducing manufacturing costs, being conveniently mounted, and having little restriction on a mounting location thereof. This belt tensioner improves fuel efficiency by reducing a tension on a belt.

BACKGROUND

A belt driving apparatus is installed in an engine of a vehicle, and the belt driving apparatus is installed on a front side of the engine of the vehicle to perform startup and driving of the engine, torque boosting of the engine, and power generation of a generator.

The belt driving apparatus may include a crank pulley provided in a crank shaft of an engine, an alternator pulley provided in a shaft of a generator (or an alternator), one or more auxiliary machine pulleys provided in shafts of one or more auxiliary machines (a water pump, a compressor, and the like), belts wound between any two of the crank pulley, the alternator pulley, and the auxiliary machine pulleys, and tensioner that provides the belts with tensions.

In a hybrid vehicle system, the engine may be started by a generator in addition to a starter, and torque boosting may be made by the generator during driving of the vehicle. A battery may be charged through generation of power during braking of the vehicle.

In this way, as the crank shaft and the generator are selectively driven as power sources for generating power, a tension side and a release side of the belt may be frequently changed, and accordingly, at least two tensioners provide tension to the belt.

However, according to the related art, since the at least two tensioners are installed, a layout of the front side of the engine is complex, and depending on the specification of the engine, it may be impossible to assemble or mount two tensioners on the engine.

Further, according to the related art, since the at least two tensioners provide the belt with a tension, the tension on the belt may become excessively high, lowering fuel efficiency.

In addition, since the at least two tensioners are required, the weight thereof may increase and the manufacturing costs may rise as well.

SUMMARY

The present disclosure provides a belt tensioner that may require a relatively small number of components by realizing a simple and compact structure, may be conveniently mounted, may reduce manufacturing costs, have little restriction on a mounting location thereof, and may improve fuel efficiency by reducing a tension of a belt.

The technical objects of the present disclosure are not limited to the above-mentioned one, and the other unmentioned technical objects will become apparent to those skilled in the art from the following description.

In accordance with an aspect of the present disclosure, there is provided a belt tensioner including a body configured to move along two or more axes, and at least two idler rollers individually rotatably installed in the body and spaced apart from each other.

The body may be movable along two or more axes by two or more guide members.

The body may have a slot famed in an interior of the body.

The two or more guide members may include a first guide member installed in the slot of the body, and a second guide member penetrating through the first guide member.

The body may extend along a first axis, and the body may be moved along the first axis by the first guide member.

An elastic member may be installed in the slot of the body, and the elastic member may allow the first guide member and the body to move relatively to each other along the first axis.

The second guide member may extend along a second axis and the body may be moved along the second axis by the second guide member.

The first axis and the second axis may intersect with each other at a specific angle.

The belt tensioner may further include a first damper interposed between the first guide member and the body.

The first damper may be formed of a frictional material.

The belt tensioner may further include a second damper interposed between the second guide member and the body.

The second damper may be formed of a frictional material.

The body may have two or more arms formed at least one end of the body, and the two idler rollers may be installed in the two or more arms to be individually rotatable.

The two or more arms may be formed at least one end of the body and symmetrical to each other.

The two or more arms may be formed at least one end of the body and asymmetrical to each other.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Referring to FIGS. 1 to 5, a belt tensioner 10 according to an embodiment of the present disclosure may include a body 11 that may be moved along two or more axis X1 and X2, and at least two idler rollers 31 and 32 installed in the body 11 to be individually rotated.

The body 11 may be moved along the two or more axes X1 and X2. For example, a tension side and a release side of the belt 4 may be frequently changed by selectively generating power in at least one of a crank shaft and a generator, and the body 11 may be moved along at least one of the two or more axes X1 and X2 as the tension side and the release side of the belt 4 are changed.

Figure 3:
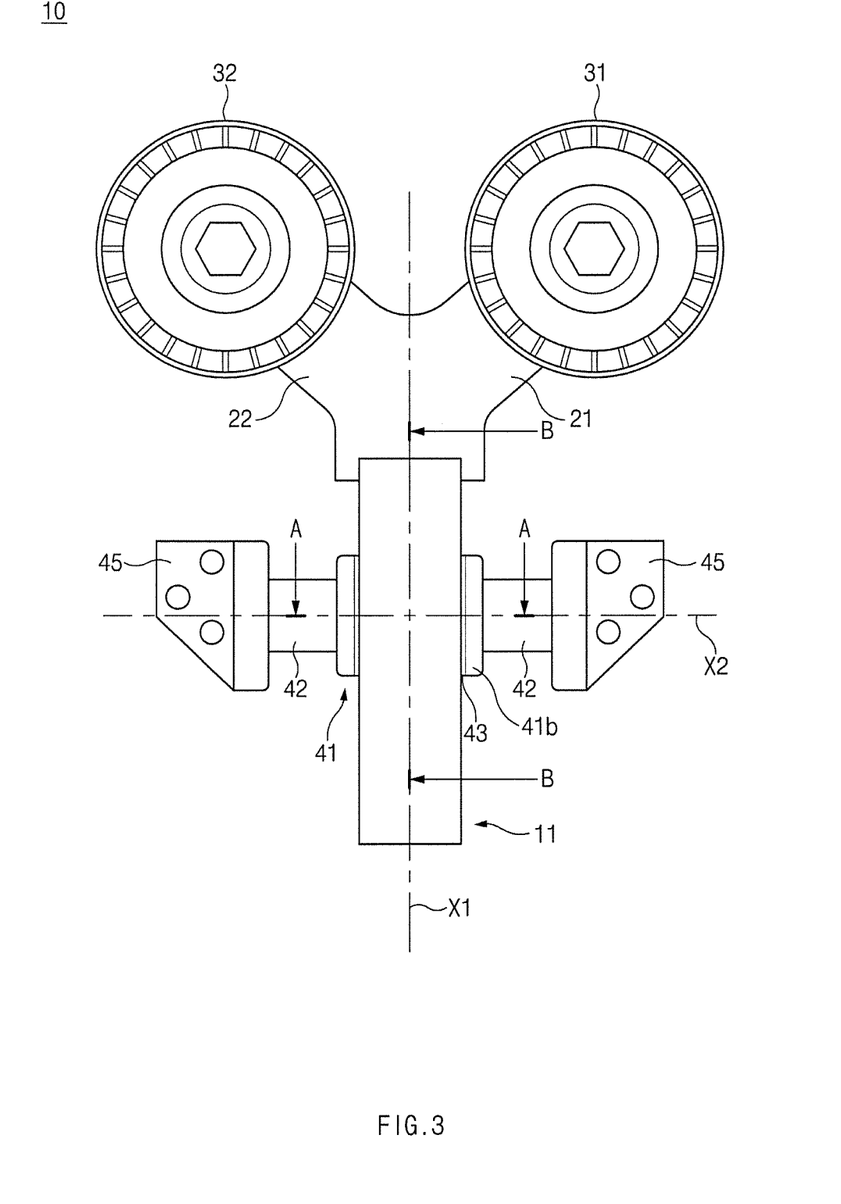
FIG. 3 is a plan view illustrating the belt tensioner of FIG. 1.

As illustrated in FIG. 3, the body 11 may be selectively moved along the first axis X1 and the second axis X2.

According to an embodiment, the first axis X1 and the second axis X2 may intersect with each other at a predetermined angle. For example, as illustrated in FIG. 3, the first axis X1 and the second axis X2 may be perpendicular to each other.

Figure 4:
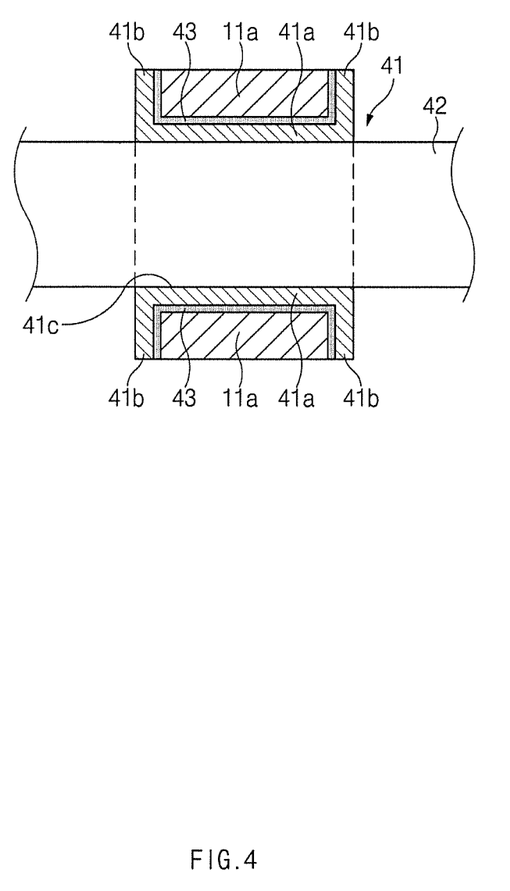
FIG. 4 is a sectional view taken along line A-A of FIG. 3.
Figure 5:
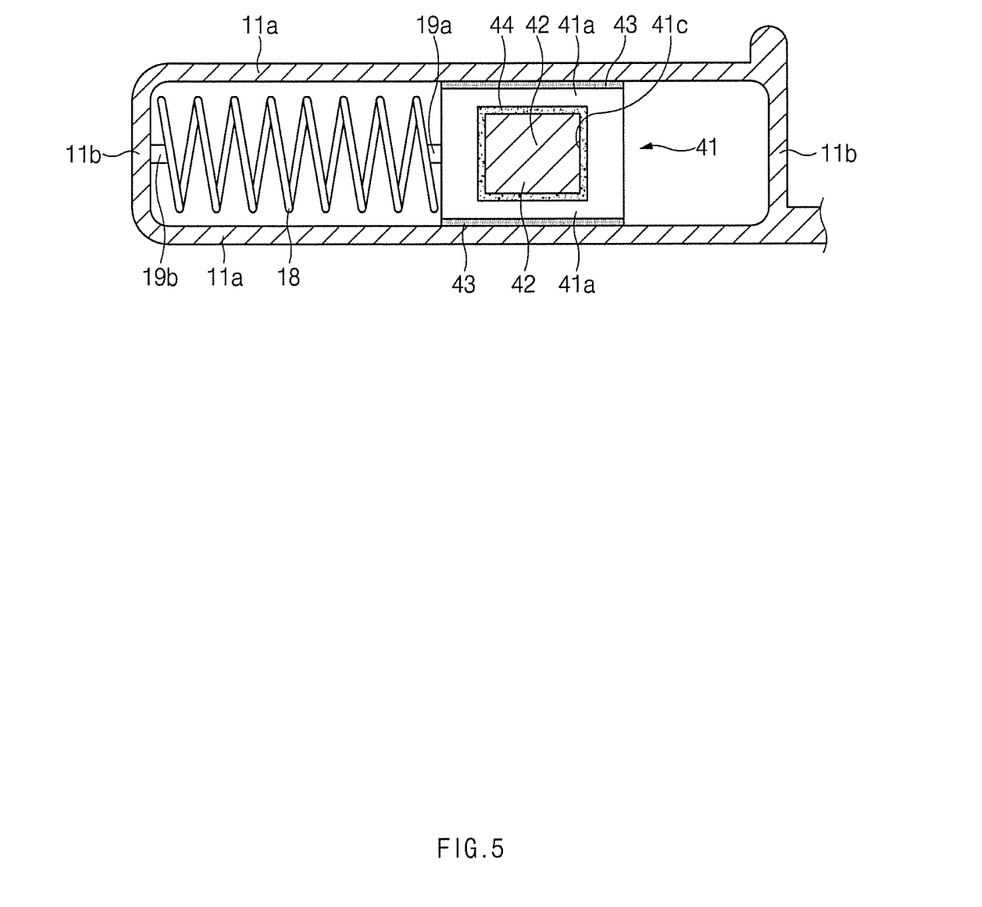
FIG. 5 is a sectional view taken along line B-B of FIG. 3.

According to an embodiment of the present disclosure, as illustrated in FIGS. 4 and 5, the body 11 may extend along the first axis X1, a slot 15 extending along the first axis X1 may be provided in the interior of the body 11, and opposite surfaces of the slot 15 may be opened. The body 11 may include a pair of first walls 11a disposed in parallel to each other, and a pair of second walls 11b formed at opposite ends of the pair of first side walls 11a. The slot 15 may be defined by the pair of first walls 11a and the pair of second walls 11b.

The pair of first walls 11a may be spaced apart from each other to extend along the first axis X1, and the pair of second walls 11b may connect ends of the pair of first walls 11a and may be disposed in parallel to be spaced apart from each other.

A first guide member 41 and a second guide member 42 may be installed in the slot 15 of the body 11.

The body 11 may be moved along the first axis X1 by the first guide member 41, and may be moved along the second axis X2 by the second guide member 42.

The first guide member 41 may be installed in the slot 15 of the body 11 to guide movement of the body 11.

The first guide member 41 may have a pair of supports 41a individually supporting the pair of first walls 11a of the body 11, and each of the supports 41a may have a pair of support bosses 41b. The pair of support bosses 41b may be spaced apart from each other at an interval corresponding to the width of the first walls 11a. Accordingly, because the first side walls 11a may be supported by the pair of support bosses 41b of the first guide member 41, the body 11 may be precisely moved along the first axis X1 by the first guide member 41.

An elastic member 18 may be installed in the slot 15 of the body 11, and the elastic member 18 may allow the first guide member 41 and the body 11 to move relatively along the first axis X1. Accordingly, the first guide member 41 may be elastically supported along the first axis X1 against the body 11 by the elastic member 18, and the body 11 may be elastically supported along the first axis X1 against the guide member 41 by the elastic member 18.

The elastic member 18 may be interposed between one surface of the guide member 41 and an inner surface of any one second wall 11b of the slot 15 in the slot 15 of the body 11, and accordingly, one end of the elastic member 18 may elastically support the first guide member 41 and an opposite end of the elastic member 18 may elastically support the body 11. As illustrated in FIG. 5, a first boss 19a, by which one end of the elastic member 18 is supported, may be formed on one surface of the first guide member 41, and a second boss 19b, by which an opposite end of the elastic member 18 is supported, may be formed on an inner surface of any one second wall 11b of the slot 15.

A pair of first dampers 43 may be individually interposed between the supports 41a and the first walls 11a, and the first dampers 43 may be famed of a frictional material. The first dampers 43 may have a structure corresponding to the supports 41a and the pair of support bosses 41b. Accordingly, if the body 11 is moved along the first axis X1, a damping force may be generated by frictions generated by relative movements of the first walls of the body 11 and the first dampers 43. The damping force may effectively prevent noise generated when the belt 4 is driven, and may improve a durability of the belt tensioner 10.

The second guide member 42 may extend along the second axis X2, the second guide member 42 may pass through the first guide member 41, the first guide member 41 may have a hollow 41c, and the second guide member 42 may pass through the hollow 41c of the first guide member 41.

The second guide member 42 and the hollow 41c of the first guide member 41 may have corresponding cross-sections.

Figure 1:
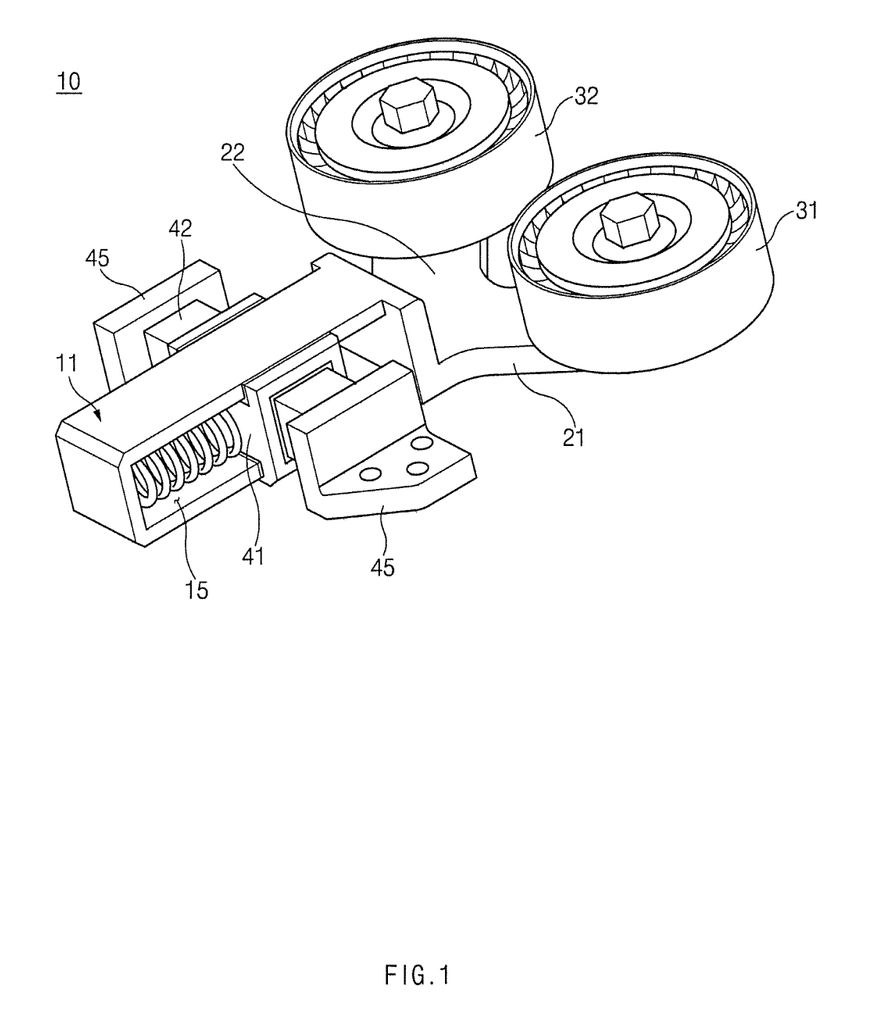
FIG. 1 is a perspective view illustrating a belt tensioner according to an embodiment of the present disclosure.
Figure 2:
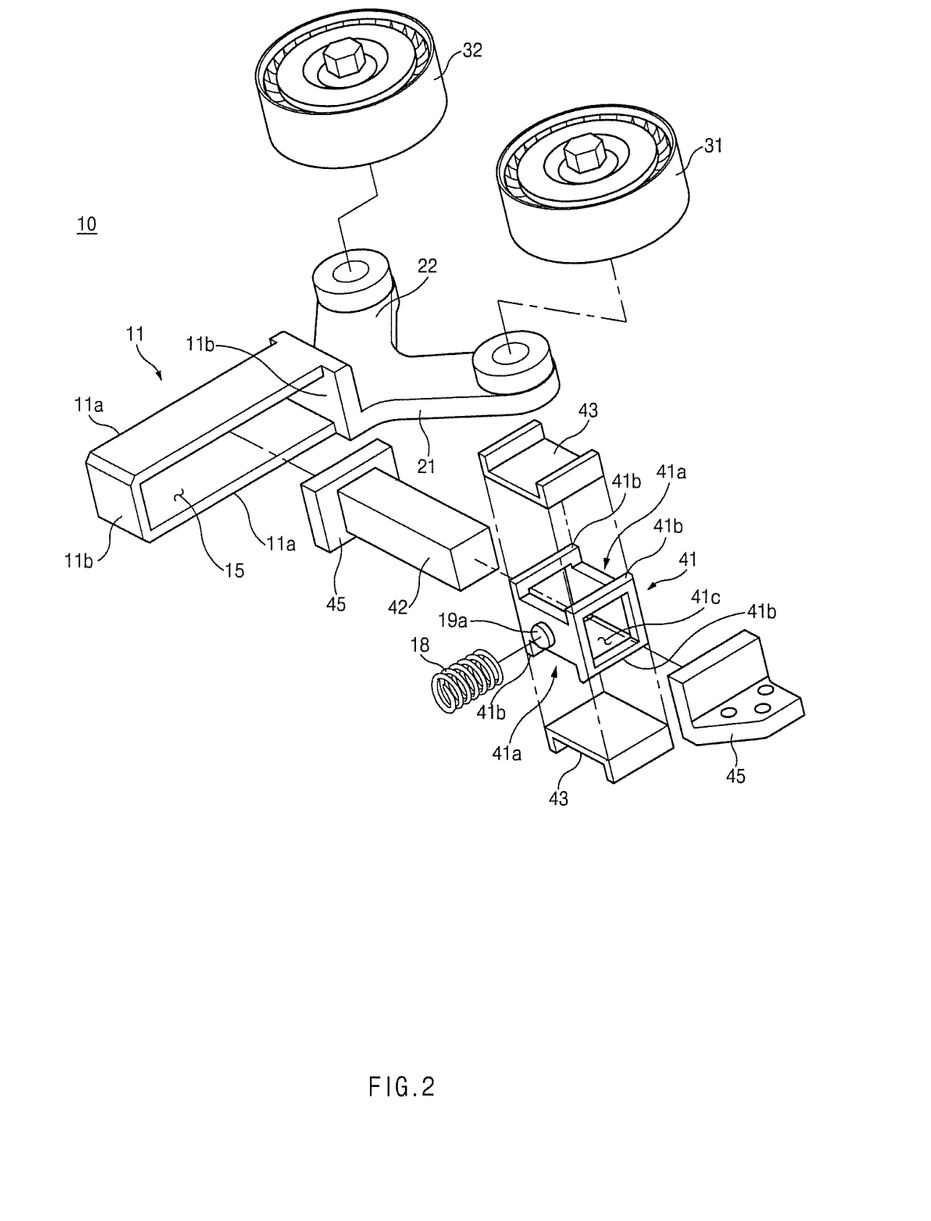
FIG. 2 is an exploded perspective view illustrating a state in which components of the belt tensioner of FIG. 1 are exploded.

According to an example, because the second guide member 42 and the hollow 41c of the first guide member 41 have angular cross-sections and thus the second guide member 42 and the first guide member 41 may stably move relative to each other, the body 11 may accurately and stably guide movement of the body 11 along the second axis X2 of the second guide member 42. For example, as illustrated in FIGS. 1 and 2, the second guide member 42 and the hollow 41c of the first guide member 41 may have rectangular cross-sections.

A second damper 44 may be interposed between an outer surface of a portion of the second guide member 42 and an inner surface of the first guide member 41, and the second damper 44 may be famed of a frictional material. The second damper 44 may have a shape surrounding an outer surface of a portion of the second guide member 42. Accordingly, if the body 11 moves along the second axis X2 along the second guide member 42, a damping force may be generated by a friction generated by a relative movement of the outer surface of the second guide member 42 and the second damper 44. The damping force may prevent effectively noise generated when the belt 4 is driven, and may improve durability of the belt tensioner 10.

Brackets 45 may be individually coupled to opposite ends of the second guide member 42, and the belt tensioner 10 may give a proper tension to the belt 4 of the belt driving apparatus 2 by mounting the brackets 45 to the belt driving apparatus 2.

In this way, because opposite ends of the second guide member 42 may be fixed to a front side of the engine 1 through the brackets 45 and the elastic member 18 is interposed between the first guide member 41 and the body 11 in the slot 15 of the body 11, one end of the elastic member 18 may elastically support the first guide member 41 and an opposite end of the elastic member 18 may elastically support the body 11, and accordingly, the tension of the belt 4 may be effectively adjusted. Further, because the tension of the belt 4 may be optimized by adjusting the stiffness of the elastic member 18, a noise problem may be effectively solved.

The at least two idler rollers 31 and 32 may be installed to be freely rotated while contacting the belt 4 of the belt driving apparatus 2.

The at least two idler rollers 31 and 32 may be spaced apart from each other and disposed at least one end of the body 11. The body 11 may have at least two arms 21 and 22, and the idler rollers 31 and 32 may be individually rotatable and installed in the arms 21 and 22 through bearings (not illustrated).

As illustrated in FIG. 3, the at least two arms 21 and 22 may include a first arm 21 extending to be inclined to the right side of the first axis X1, and a second arm 22 extending to be inclined to the left side of the first axis X1.

The first idler roller 31 may be rotatably installed in the first arm 21, and the second idler roller 32 may be rotatably installed in the second arm 22.

FIGS. 1 to 3 illustrate that two arms 21 and 22 are formed at one end of the body 11 to be symmetrical to each other with respect to the first axis X1 and thus the idler rollers 31 and 32 are disposed to be symmetrical to each other. The present disclosure is not limited thereto, but the numbers of the arms and the idler rollers and the shape of the arms may be variously modified in correspondence to the layout of the belt driving apparatus installed on the front side of the engine.

According to one aspect of the present disclosure, a single simple and compact belt tensioner 10 may be effectively realized by disposing two idler rollers 31 and 32 at least one end of the body 11 such that the idler rollers 31 and 32 are spaced apart from each other. Accordingly, because the single belt tensioner 10 may be mounted on the belt driving apparatus 2, the tension of the belt 4 may be reduced and accordingly, fuel efficiency may be improved.

Further, the embodiments of the present disclosure may be easily applied according to various specifications of the engine since little restriction is made to a mounting location of a belt tensioner due to simple and compact structure of the belt tensioner. The number of parts of the belt tensioner may be reduced, and the weight of the belt tensioner may be reduced, thereby reducing manufacturing costs.

Figure 6:
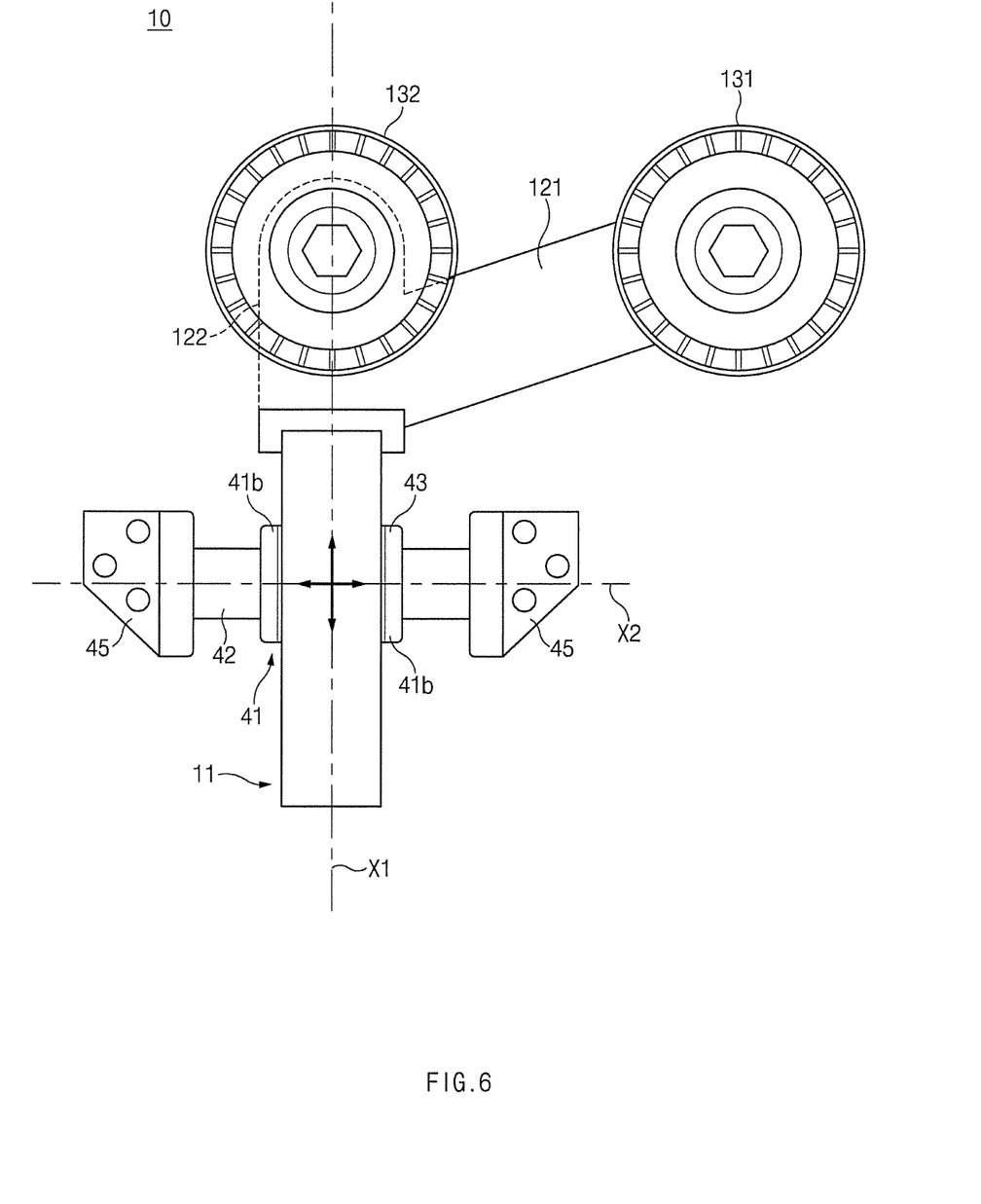
FIG. 6 is a plan view illustrating a belt tensioner according to another embodiment of the present disclosure.

FIG. 6 is a plan view illustrating a belt tensioner 10 according to another embodiment of the present disclosure.

According to FIG. 6, since two arms 121 and 122 are asymmetrically formed with respect to the first axis X1 at one end of the body 11 and two idler rollers 131 and 132, that are individually rotatable, installed in the two arms 121 and 122, the two idler rollers 131 and 132 may be disposed to be asymmetrical to each other. A first arm 121 may extend in an inclination direction on the right side of the first axis X1, and a second arm 122 may extend along the first axis X1. A first idler roller 131 may be rotatably installed in the first arm 121, and a second idler roller 132 may be rotatably installed in the second arm 122.

The remaining configurations and operations thereof are the same as or similar to those of the preceding embodiments, and a detailed description thereof will be omitted.

Figure 7:
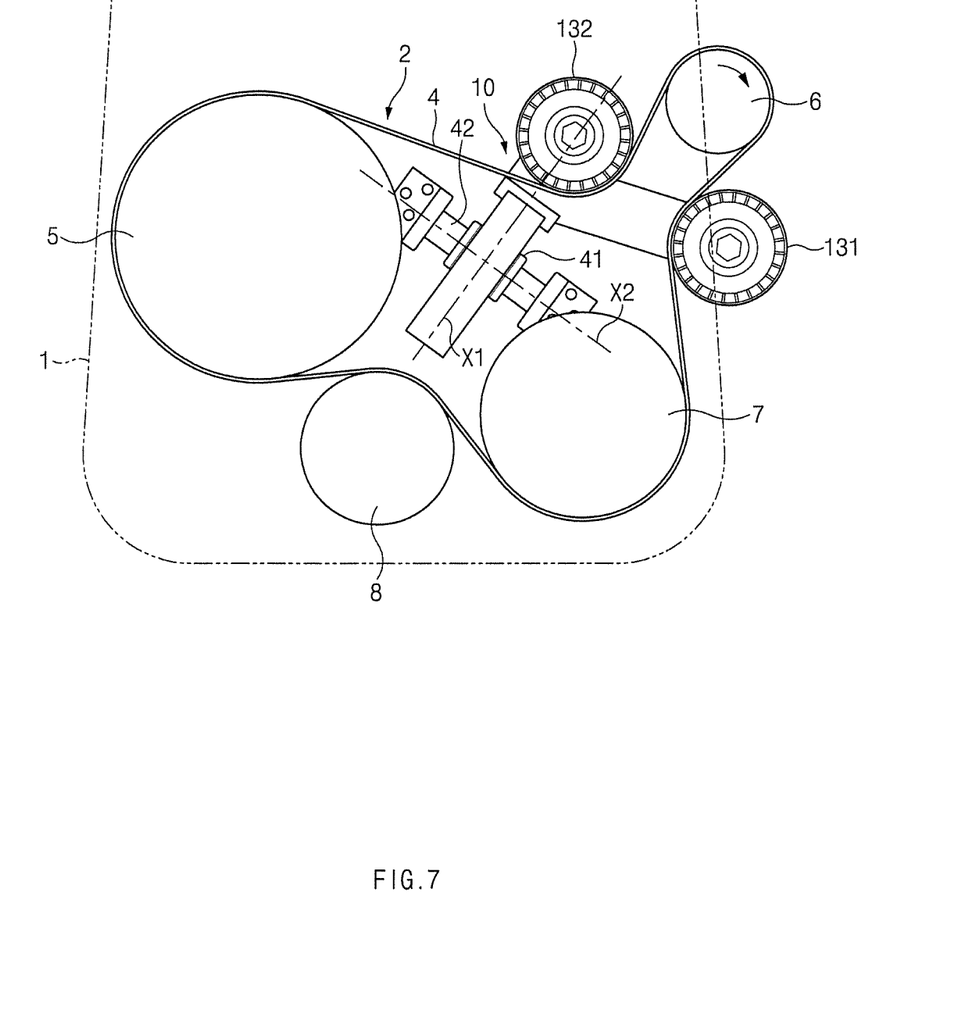
FIG. 7 is a view illustrating a state in which the bent tensioner of FIG. 6 is mounted to a belt driving apparatus of a vehicle.

FIG. 7 is a view illustrating one form of the belt driving apparatus 2 installed on the front side of the engine 1.

The belt driving apparatus 2 of FIG. 7 may have a crank pulley 5 disposed on the left side, a generator pulley 6 disposed on the right side, a compressor pulley 7 disposed between the crank pulley 5 and the generator pulley 6, and a belt 4 wound on the crank pulley 5, the generator pulley 6, and the compressor pulley 7. Here, the crank pulley 5 is installed in a crank shaft of the engine 1, the generator pulley 6 is installed in a shaft of the generator (not illustrated), and the compressor pulley 7 is installed in a shaft of the compressor (not illustrated).

FIGS. 7 to 11 illustrate a structure in which the belt tensioner 10 according to the embodiment of FIG. 6 is mounted on the belt driving apparatus 2.

FIGS. 8 to 11 are views illustrating an operation of the belt tensioner 10 according to the embodiment of FIG. 6, based on the driving state of the belt driving apparatus 2.

Figure 8:
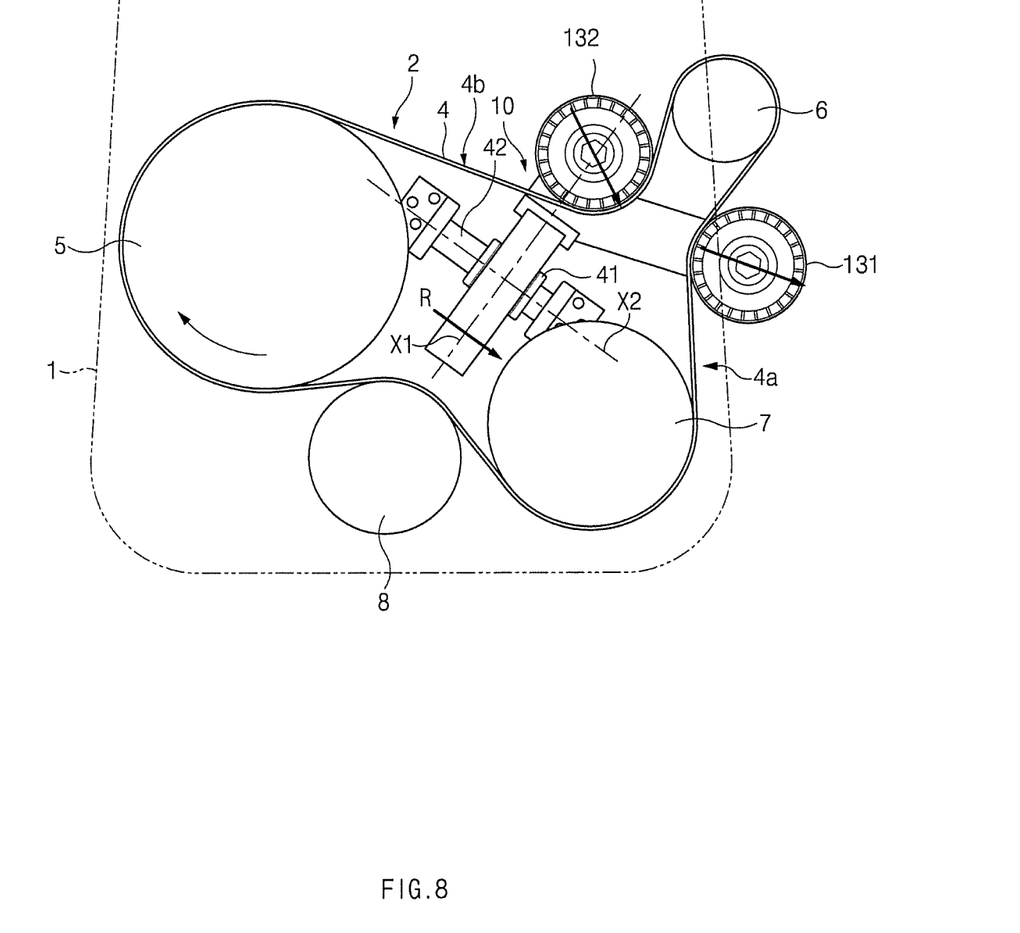
FIG. 8 is a view illustrating a state in which an engine is started by a starter in FIG. 7.

FIG. 8 illustrates an engine started by a starter (not illustrated) in the belt driving apparatus 2 of FIG. 7, and accordingly, the generator generates power when the compressor pulley 7 and the generator pulley 6 are rotated through driving of the crank pulley 5.

Accordingly, in FIG. 8, a tensioned side 4a may be formed in a lower section of the belt 4, and a loosened side 4b may be formed in an upper section of the belt 4. In the state of FIG. 8, the body 11 of the belt tensioner 10 may move to the right side (see the direction of arrow R) in the second axis X2 such that the loosened side 4b of the belt 4 may be tensioned.

Figure 9:
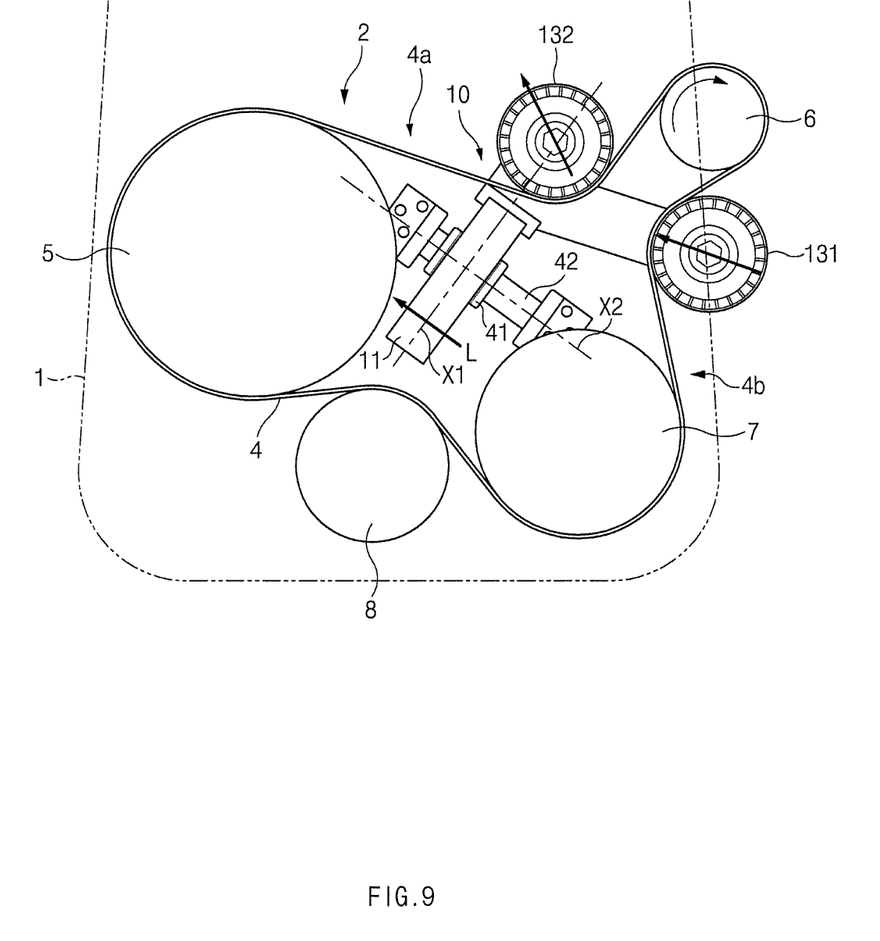
FIG. 9 is a view illustrating a state in which an engine is started by a generator in FIG. 7.

FIG. 9 illustrates a state in which the engine is started through driving of the generator (not illustrated) in the belt driving apparatus 2, and accordingly, the crank pulley 5 and the compressor pulley 7 are rotated through driving of the generator pulley 6.

Accordingly, in FIG. 9, a tensioned side 4a may be formed in an upper section of the belt 4, and a loosened side 4b may be famed in a lower section of the belt 4. In the state of FIG. 9, the body 11 of the belt tensioner 10 may move to the left side (see the direction of arrow L) in the second axis X2 along the second guide member 42 such that the loosened side 4b of the belt 4 may be tensioned.

Figure 10:
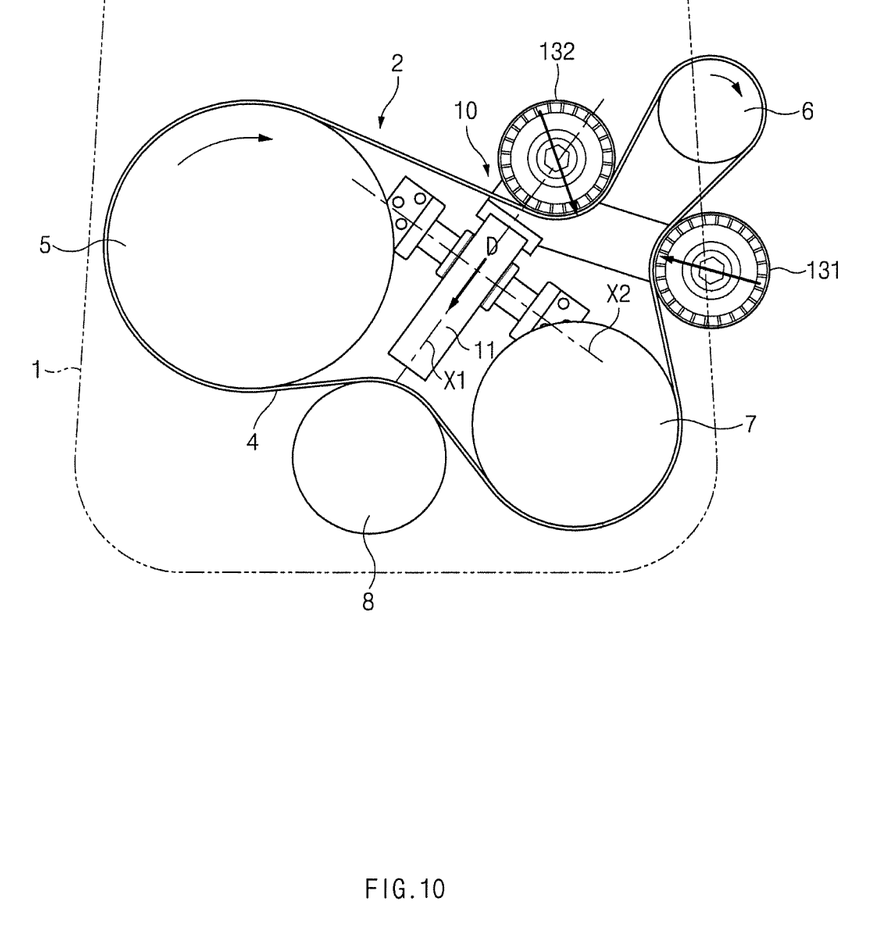
FIG. 10 is a view illustrating a state in which both a crank shaft and the generator are driven in FIG. 7.

FIG. 10 illustrates a state in which in the belt driving apparatus 2 of FIG. 7, both the engine and the generator are driven as in torque boosting, and both the crank pulley 5 and the generator pulley 6 are driven.

Accordingly, because the entire section of the belt 4 may be loosened in FIG. 10, the body 11 of the belt tensioner 10 may be moved to a lower side (see the direction of arrow D) in the first axis X1 along the first guide member 41 such that the entire section of the belt 4 is loosened in the state of FIG. 10.

Figure 11:
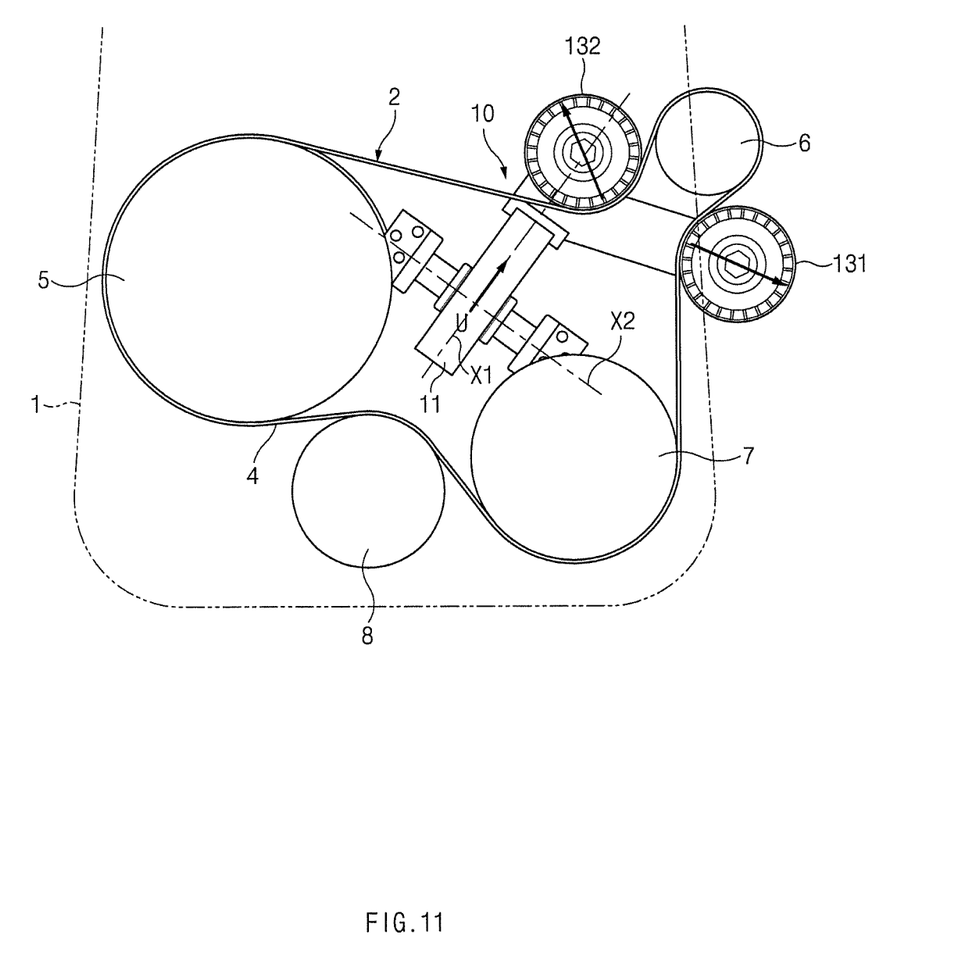
FIG. 11 is a view illustrating a state in which neither a crank shaft or the generator is driven in FIG. 7.

FIG. 11 illustrates a state in which in the belt driving apparatus 2 of FIG. 7, neither the engine nor the generator is driven as in coasting, and neither the crank pulley 5 nor the generator pulley 6 is driven.

Accordingly, because the entire section of the belt 4 may be loosened in FIG. 11, the body 11 of the belt tensioner 10 may be moved to an upper side (see the direction of arrow U) in the first axis X1 along the first guide member 41 in the state of FIG. 11.

Figure 12:
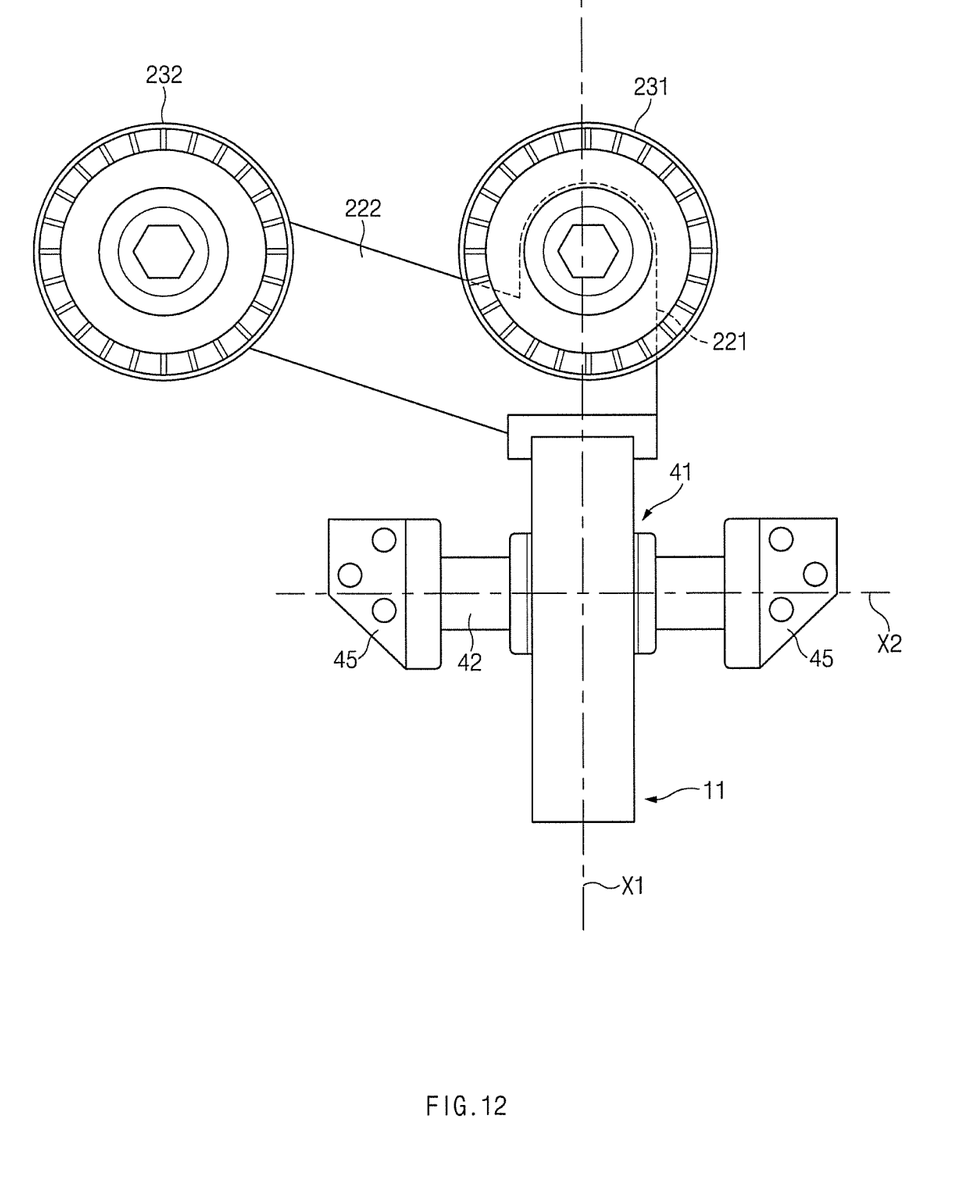
FIG. 12 is a plan view illustrating a belt tensioner according to still another embodiment of the present disclosure.

FIG. 12 is a plan view illustrating a belt tensioner 10 according to still another embodiment of the present disclosure.

According to FIG. 12, a first arm 221 may extend along the first axis X1, and a second arm 222 may extend in an inclination direction on the left side of the first axis X1. A first idler roller 231 may be rotatably installed in the first arm 221, and a second idler roller 232 may be rotatably installed in the second arm 222.

The remaining configurations and operations thereof are the same as or similar to those of the preceding embodiments, and a detailed description thereof will be omitted.

Figure 13:
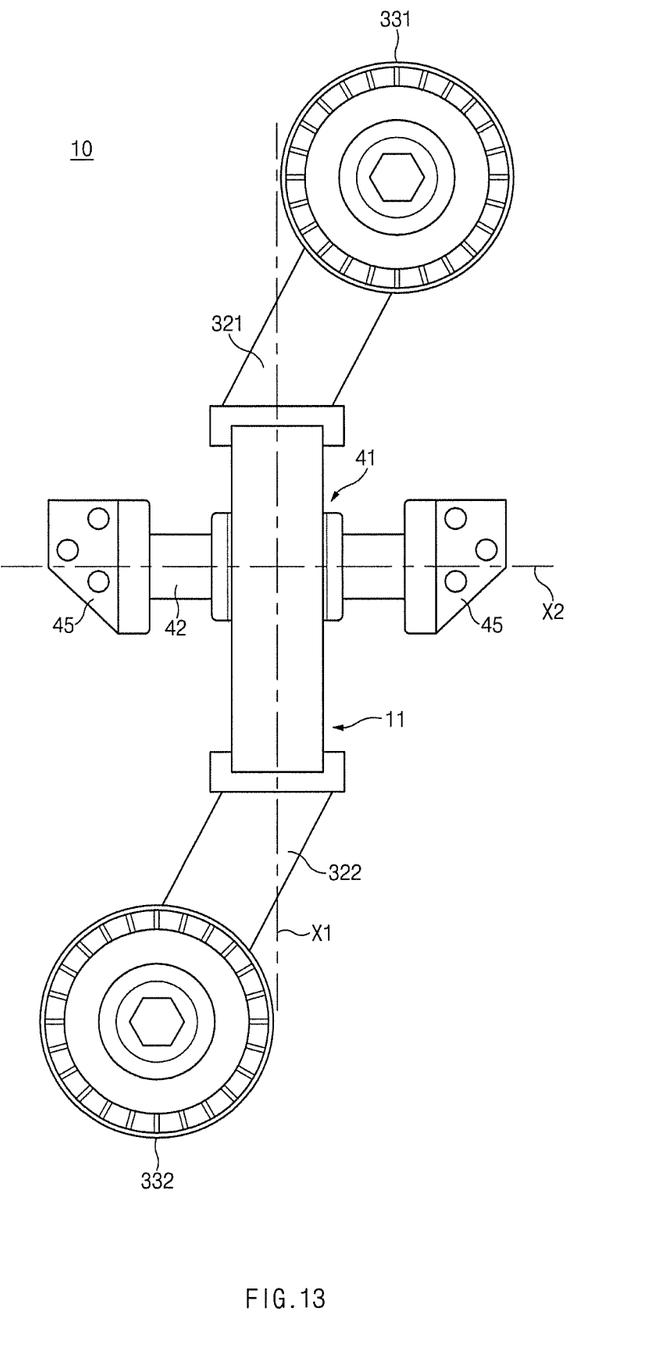
FIG. 13 is a plan view illustrating a belt tensioner according to yet another embodiment of the present disclosure.
Figure 14:
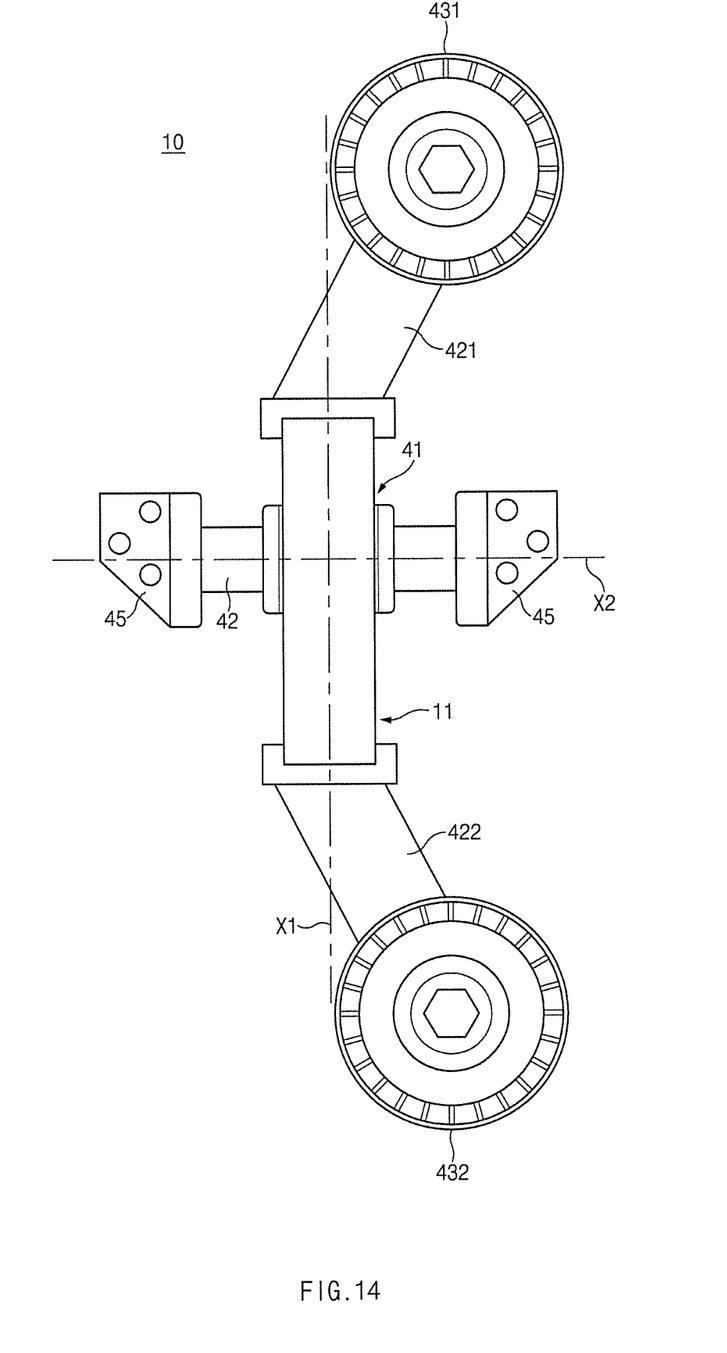
FIG. 14 is a plan view illustrating a belt tensioner according to yet still another embodiment of the present disclosure.

As illustrated in FIGS. 13 and 14, two arms may be individually formed in different ends of the body 11, and accordingly, two idler rollers may be disposed at different ends of the body 11.

FIG. 13 is a plan view illustrating a belt tensioner 10 according to yet another embodiment of the present disclosure.

According to FIG. 13, a first arm 321 may be formed at one end of the body 11, and the first arm 321 may extend in an inclination direction on the right side of the first axis X1. A second arm 322 may be formed at an opposite end of the body 11, and the second arm 322 may extend in an inclination direction on the left side of the first axis X1. A first idler roller 331 may be rotatably installed in the first arm 321, and a second idler roller 332 may be rotatably installed in the second arm 322.

FIG. 14 is a plan view illustrating a belt tensioner 10 according to yet still another embodiment of the present disclosure.

According to the embodiment of FIG. 14, a first arm 421 may be formed at one end of the body 11, and the first arm 421 may extend in an inclination direction on the right side of the first axis X1. A second arm 422 may be formed at an opposite end of the body 11, and the second arm 422 may extend in an inclination direction on the right side of the first axis X1. A first idler roller 431 may be rotatably installed in the first arm 421, and a second idler roller 432 may be rotatably installed in the second arm 422.

As in the various embodiments of the present disclosure, at least two arms may extend in a specific direction at least one end of the body 11, and accordingly, the at least two idler rollers may be disposed at least one end of the body 11 to be symmetrical or asymmetrical to each other.

According to the present disclosure, because the two idler rollers are disposed at least one end of the body to be spaced apart from each other, the single belt tensioner having a simple and compact structure may be realized. Accordingly, because the single belt tensioner may be mounted on the belt driving apparatus, the tension of the belt may be reduced and fuel efficiency may be improved.

According to the embodiments of the present disclosure, due to the simple and compact structure, little restriction is made to the mounting location of the belt tensioner and, accordingly, the belt tensioner may be easily applied to the engine according to various specifications of engines.

According to the present disclosure, due to the simple and compact structure, the number of parts of the belt tensioner is relatively small, the weight of the belt tensioner is reduced, and manufacturing costs are reduced.

According to the present disclosure, the tension of the belt may be reduced by allowing one elastic member to elastically support the body, and because the tension of the belt may be optimized through adjustment of the stiffness of the elastic member, a noise problem may be solved.

According to the present disclosure, because a proper damping force may be maintained by the first and second dampers when the body is moved along the first guide member and the second guide member, a noise generation may be prevented.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A belt tensioner comprising:
 a body configured to move along two or more axes; and
 at least two idler rollers individually rotatably installed on the body and spaced apart from each other.

2. The belt tensioner of claim 1, wherein the body is movable along two or more axes by two or more guide members.

3. The belt tensioner of claim 2, wherein the body has a slot formed in an interior of the body.

4. The belt tensioner of claim 3, wherein the two or more guide members include:
 a first guide member installed in the slot of the body; and
 a second guide member penetrating through the first guide member.

5. The belt tensioner of claim 4, wherein the body extends along a first axis, and the first guide member is configured to guide a movement of the body along the first axis.

6. The belt tensioner of claim 5, wherein an elastic member is installed in the slot of the body, and the elastic member allows the first guide member and the body to move relatively to each other along the first axis.

7. The belt tensioner of claim 6, wherein the second guide member extends along a second axis and the second guide member is configured to guide a movement of the body along the second axis.

8. The belt tensioner of claim 7, wherein the first axis and the second axis intersect with each other at a specific angle.

9. The belt tensioner of claim 4, further comprising:
 a first damper interposed between the first guide member and the body.

10. The belt tensioner of claim 9, wherein the first damper is formed of a frictional material.

11. The belt tensioner of claim 4, further comprising:
 a second damper interposed between the second guide member and the body.

12. The belt tensioner of claim 11, wherein the second damper is formed of a frictional material.

13. The belt tensioner of claim 1, wherein the body has two or more arms, and
   wherein the two idler rollers are installed on the two or more arms to be individually rotatable.

14. The belt tensioner of claim 13, wherein the two or more arms are disposed on at least one end of the body and symmetrical about the first axis.

15. The belt tensioner of claim 13, wherein the two or more arms are disposed on at least one end of the body and asymmetrical about the first axis.

* * * * *